(No Model.)

E. D. ROCKWELL.
BRAKE FOR BICYCLE WHEELS.

No. 524,839.　　　　　　　　　Patented Aug. 21, 1894.

WITNESSES:
A. D. Harrison.
Rollin Abell.

INVENTOR:
E. D. Rockwell
by Wright Brown Quimby
Attys.

UNITED STATES PATENT OFFICE.

EDWARD D. ROCKWELL, OF BRISTOL, CONNECTICUT, ASSIGNOR TO THE NEW DEPARTURE BELL COMPANY, OF SAME PLACE.

BRAKE FOR BICYCLE-WHEELS.

SPECIFICATION forming part of Letters Patent No. 524,839, dated August 21, 1894.

Application filed March 30, 1894. Serial No. 505,756. (No model.)

*To all whom it may concern:*

Be it known that I, EDWARD DAYTON ROCKWELL, of Bristol, in the county of Hartford and State of Connecticut, have invented certain new and useful Improvements in Brakes for Bicycle-Wheels, of which the following is a specification.

This invention has relation, in its most comprehensive sense, to brakes for wheels generally; and, in its more confined sense, it appertains to brakes for wheels having yielding tires, such as are employed in bicycles.

It is the object of the invention to provide a brake of the character mentioned which, while acting most efficiently to retard the movement of the wheel, when it is applied thereto, will yet operate so as to avoid abrading or tearing the tire, or having other injurious effect such as follows the use of the application to and pressure upon a tire of a rigid, unyielding shoe or spoon, in which substantially all of the frictional resistance to the movement of the wheel comes between the tire and the shoe or spoon.

To these ends the invention consists of a brake for wheels hereinafter fully described and particularly pointed out in the claims.

Reference is to be had to the annexed drawings, and to the letters marked thereon, forming a part of this specification, the same letters designating the same parts or features, as the case may be, wherever they occur.

Figure 1:
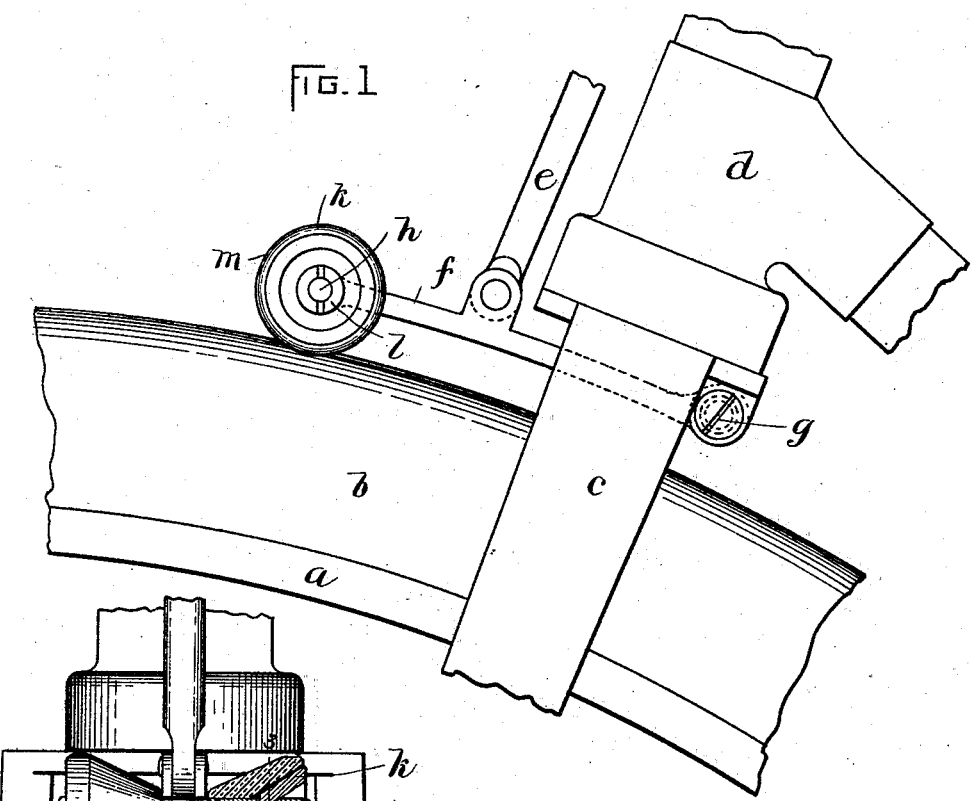
Figure 2:
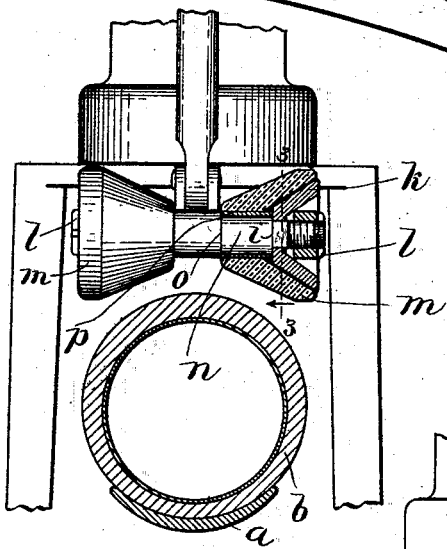
Figure 3:
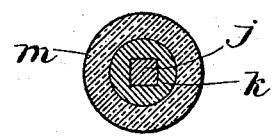
Figure 4:
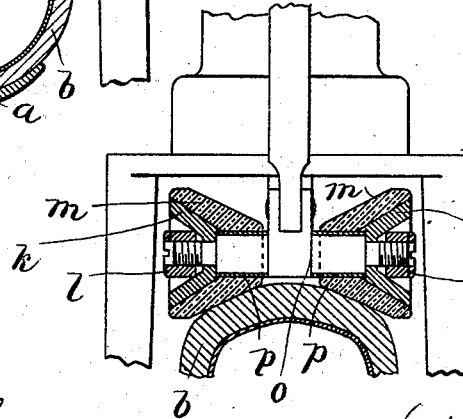

Of the drawings—Figure 1 is a side elevation of the invention, showing one form of means of its application to a bicycle wheel. Fig. 2 is a front view of the same, partially in section, showing the brake in "off" position or position out of use. Fig. 3 is a sectional detail view taken on the line 3—3 of Fig. 2 showing the construction of the form of means which I have chosen to illustrate my improvements, at the point indicated by said sectional line. Fig. 4 is a diagram, partially in section, showing the invention as applied to a bicycle wheel in the operation of braking or retarding the movement of the same.

In the drawings—$a$ indicates what may be understood as a bicycle wheel or the rim thereof.

$b$ is the pneumatic or yielding tire of the wheel.

$c$ is the fork, and, $d$, indicates other parts of the frame of the machine.

$e$ is the brake rod adapted to be operated longitudinally or vertically in the usual or any suitable manner. To the lower end of the brake-rod there is pivoted or otherwise suitably connected the brake-arm, $f$, which is pivoted at its rear end, as at $g$, to the frame of the machine, and is provided on its forward end with the brake proper for application to the wheel to retard the motion of the latter.

The brake, in the form chosen by me to illustrate and describe the purpose and use of the invention, as also a way in which it may be made, consists of a spindle or shaft, $h$, connected in suitable manner with the forward end of the brake-arm, $f$. Near the outer ends of the spindle, $h$, the latter is provided with shoulders or offsets, $i$, and outward from these features and adjacent thereto the said spindle is squared, as at $j$, to receive thereon frusto-conical hubs, $k$, each having a squared opening in its center to fit on the squared parts, $j$, of the spindle, $h$. The extreme outer ends of the spindle, $h$, are screw-threaded so that nuts, $l$, may be turned on the said screw-threaded parts and hold the hubs, $k$, in place.

$m$ are what may be called "brake-cones," adapted in the use of the invention to be brought into direct contact with the tire, $b$. The said brake-cones are of substantially hollow frustro-conical form, and having a rounded opening in the center so as to be applied to the rounded part, $n$, of the spindle, $h$, between the hubs, $k$, and the shoulders or offsets, $o$, of the spindle, $h$.

$p$ designates a bushing which may by preference, though not necessarily, be applied to the rounded part, $n$, of the spindle, $h$, between the latter and the bearing of the brake-cones, $m$.

In the use of the invention the brake-rod, $e$, will be arranged so as to be conveniently operated by the occupant of the bicycle, as is now done, or in any other suitable way, it being essential only that the said brake-rod should be adapted to be moved vertically so as to apply and release the brake. In the application of the brake to the wheel, the brake-rod will be moved downward, forcing downward the arm, f, and causing the brake-cones, m, to bear upon the tire, b. In pressing the brake-cones upon the tire, the former will be forced outward, and by reason of the friction exerted between the same, and the surfaces of the frusto-conical hubs, k, with which they come in contact their rotation will be retarded, and they will act to retard the rotation of the wheel, a, in accordance with the degree of pressure of the cones on the wheel. By these means the tire, b, of the wheel will be practically entirely relieved of the frictional tearing and abrading action exerted by the rigid shoe or spoon now commonly employed in brakes to brake or resist the rotation of bicycle wheels.

The several parts of the brake may be made of material best suited to their uses, for example, the spindle, h, may be made of iron or steel, the hubs, k, of gun metal, the bushings, p, of case-hardened metal, and the brake-cones, m, of indurated fiber.

The invention has been found, in practice, to be particularly useful on bicycles, where it is necessary or desirable to apply the brake directly to the yielding tire to retard the movement of the wheel, and where a rigid brake is liable to abrade or tear the tire, by reason of the fact that all frictional resistance is confined between the surface of the tire and the surface of the brake shoe or spoon. In my invention the frictional resistance is divided between the brake-cones and their hub and between the said cones and the tire, so that all shock or abrupt retardation of the motion of the wheel is avoided, and the objections consequent upon said action are likewise overcome.

The use of the invention on bicycles in "coasting" is particularly advantageous, since undue wear of the tire is avoided and an even and smooth operation of the machine is secured by reason of the perfect control of the speed of the machine of which the device permits.

Having thus explained the nature of the invention and described a way of constructing and using the same, though without attempting to set forth all of the forms in which it may be made or all of the modes of its use, it is declared that what is claimed is—

1. A brake for bicycle wheels consisting of two oppositely arranged loose revolube cones, adapted to be brought to bear upon the wheel, and a conical friction hub for each cone, as set forth.

2. A brake for bicycle wheels consisting of a spindle, bushings on the spindle, two oppositely arranged loose revoluble cones adapted to turn on the bushings and to be brought to bear upon the wheel, and a conical friction hub for each cone, as set forth.

In testimony whereof I have signed my name to this specification, in the presence of two subscribing witnesses, this 19th day of March, A. D. 1894.

EDWARD D. ROCKWELL.

Witnesses:
M. BENJAMIN HOLDEN,
ROGER S. NEWELL.